UNITED STATES PATENT OFFICE.

WALLACE ALEXANDER, OF JERSEY CITY, NEW JERSEY, ASSIGNOR TO THE DE LAVAL SEPARATOR COMPANY, OF NEW YORK, N. Y., A CORPORATION OF NEW JERSEY.

PROCESS FOR THE SEPARATION OF FOOD PRODUCTS FROM FRESH COCOANUTS.

1,366,339. Specification of Letters Patent. Patented Jan. 25, 1921.

No Drawing. Application filed May 21, 1919. Serial No. 298,796.

*To all whom it may concern:*

Be it known that I, WALLACE ALEXANDER, a citizen of the United States, residing at Jersey City, county of Hudson, and State of New Jersey, have invented a new and useful Improvement in Processes for the Separation of Food Products from Fresh Cocoanuts, of which the following is a full, clear, and exact description.

The object of my invention is to so treat the meats of fresh cocoanuts as to obtain an edible product which is fit for human consumption and a pure dry oil.

Heretofore, the meats have been dried to a moisture content of 3 to 8 per cent. and pressed in a high power press, thereby extracting a clear oil, the solid residue being unfit for human food. It has also long been known to take the copra (which is the name usually applied to the meats as dried by the native producers and which has, say, about a five per cent. moisture content) and subject it to pressure to expel the oil, the oil being then passed through a filter to separate the "foots," which are not available for human consumption. If the meats contain between (say) 10 and 18 per cent. moisture, on pressure a hazy oil is obtained; while if the percentage of moisture is above 18, an emulsion is obtained. Fresh cocoanut meats contain from 60 to 65 per cent. moisture, and therefore, in the treatment of fresh, or relatively fresh, cocoanut meats, the pressure process, without other treatment is unavailable to produce a clear oil.

In my process I treat fresh (using the term in a relative sense) cocoanut meats, do not employ a high power press, and yet obtain both a pure dry oil and either an edible by-product adapted for human consumption or by-products adapted for stock food, flavoring and candy manufacture.

The shells are first separated from the meats by any convenient process.

The meats, separated from the shells, are ground, and if desired pared. They are mildly heated, say to preferably about 105 degrees F. (or about 40 degrees C.), but not to exceed 150° F. No water is added, and there is no drying, or loss of moisture, except that incidental to the mild temperature to which they are exposed. Heating to about this degree is necessary to keep the oil melted and flowing freely from the press. The press may be any low power press of approved standard. The extract will contain from 35 to 45 per cent. oil. The pressed cake retains a small percentage of the oil and is available as a stock food, although I prefer to adapt it for human consumption, as hereinafter described.

I may then run the extract either through a centrifugal clarifier and afterward through a centrifugal separator, or I may run the extract through only the separator. In the first case a yellowish brown sediment remains in the clarifier bowl; in the second case it remains in the separator bowl. It is adapted for various uses, as, for example, in the manufacture of candy. Any efficient cream separator may be used, but preferably I employ a special separator of the type set forth in the Snyder Patent No. 1,283,343, dated October 29, 1918. The centrifugal action separates the extract into two parts. The heavier part is an aqueous portion that contains all of the cocoanut flavor with only a trace of oil and which is available for use in flavoring food products. The lighter separated constituent is a creamy emulsion of albumin and oil, the oil content being from 85 to 90 per cent. The yellowish brown sediment, instead of being used separately, may be added to the aqueous flavoring extract.

During the above separations, the temperature is preferably maintained at about the temperature hereinbefore mentioned.

The creamy emulsion may, if desired, be pasteurized. The temperature of pasteurization should be about 63° C. (or about 145° F.) followed by cooling to about 36° C. (or about 98° F.)

To the creamy emulsion is added about 10 to 20 per cent. of water. More water may be added, but disadvantageously, as all of it must be ultimately removed. The emulsion is then run into an autoclave and subjected to sufficient heat to develop about ten to twenty pounds steam pressure until the emulsion is broken. Ordinarily two hours is ample. The pressure is then released and the mixture of oil and albumin water is passed through a special centrifugal separator adjusted to deliver dry oil. The ordinary cream separator is probably not available, but a separator and purifier constructed in accordance with the Snyder patent above named has been found efficient. The cocoanut oil obtained is free from albumin and dirt and contains only traces of fatty acids and moisture. The free fatty acids should not be above 0.1 per cent., calculated as oleic acid. The moisture should be within the same limit.

The heavier liquid ingredient separated out consists of water and albumin sludge.

The oil does not require refining, as it may be used as shortening and flavor by biscuit manufacturers.

The cream should be prepared as quickly as possible, because the extract ferments quite rapidly; but the cream, after separation from the extract, is fairly stable. It is also important, for the same reason, that as little water as possible should be used in the preparation of the extract.

I prefer to add the aqueous flavoring extract, obtained in the first centrifugal separating action, to the pressed cake obtained in the pressing operation, thereby forming a food product which is well adapted for human consumption. This edible product differs from the untreated fresh meats only in that it contains a substantially smaller proportion of oil. That is, the pressing operation, as performed by a low power press, is not effective to eliminate all the oil from the cake. The retention in the cake of a small percentage of oil is of advantage, as it adds to the food value of the product. On the other hand, the elimination of the larger portion of the oil materially enhances the digestibility of the product. In other words, the product has an ideal percentage of oil and is better adapted for human consumption than the untreated fresh meats and commands a ready sale.

By means of my invention, therefore, I extract the larger percentage of the oil, in a pure dry condition, by an inexpensive process, and have left a product which, for food purposes, is substantially as valuable as, and substantially more digestible than, the original product.

While the addition of the flavoring extract to the pressed cake to form an edible product for human consumption is the preferable mode of utilizing what might be called the by-products, the aqueous extract resulting from the first centrifugal separation process may be sold separately as a flavor and the pressed cake used as a food. In fact, my process of extracting oil is so comparatively simple and inexpensive that the process is of utility regardless of the value of the by-products, although the by-products, disposed of in the manner preferred by me, are approximately of the same commercial value as the oil.

Instead of utilizing, to carry out the final step, a special centrifugal separator to separate the oil from the water, the separation may be effected by gravity; but the separation will be less thorough, the oil will be less pure, the time required for carrying out the process will be seriously prolonged, and some of the oil in the neutral zone will be wasted.

Having now fully described my invention, what I claim and desire to protect by Letters Patent is:

1. The process of treating the meats of cocoanuts and the like which comprises subjecting the meats to pressure, separating from the liquid extract the larger part of the water to form an aqueous flavoring extract and a creamy emulsion consisting mainly of oil, and treating the creamy emulsion to eliminate the larger part of the water and contained albumin.

2. The process of treating the meats of cocoanuts and the like which comprises subjecting the meats to pressure, separating from the liquid extract the larger part of the water to form an aqueous extract and a creamy emulsion consisting mainly of oil, breaking down the emulsion by subjecting it to heat and pressure, and separating the oil from the water and albumin.

3. The process of treating the meats of cocoanuts and the like which comprises subjecting the meats to pressure, separating from the liquid extract the larger part of the water to form an aqueous extract and a creamy emulsion consisting mainly of oil, subjecting the emulsion to heat and pressure, and applying centrifugal force to eliminate the water and albumin from the oil.

4. The process of treating the meats of cocoanuts and the like which comprises subjecting the meats to pressure, separating from the liquid extract the larger part of the water to form an aqueous extract and a creamy emulsion consisting mainly of oil, adding water to the emulsion, subjecting the emulsion to heat and pressure, and applying centrifugal force to eliminate from the oil the original and added water.

5. The process of treating the meats of cocoanuts and the like which comprises subjecting the meats to pressure, applying to the liquid extract centrifugal force to separate the same into an aqueous extract and a creamy emulsion consisting mainly of oil, adding water to the emulsion and subjecting it to heat and pressure, and applying centrifugal force to eliminate the water from the oil.

6. The process of treating the meats of cocoanuts and the like which comprises pressing the undried meats to extract the liquid content and produce a substantially solid edible product, and applying centrifugal force to the extract so as to separate the same into a creamy emulsion containing a large percentage of oil and an aqueous flavoring extract.

7. The process of treating the meats of cocoanuts and the like which comprises extracting the liquid content from the meats by mechanical pressure, applying centrifugal force to separate from the liquid extract the larger part of the water leaving a creamy emulsion consisting mainly of oil, and afterward treating the creamy emulsion to eliminate the larger part of the water and contained albumin.

8. The process of treating the meats of cocoanuts and the like which comprises pressing the undried meats to extract the liquid content and produce a substantially solid edible product, applying to the extract centrifugal force so as to separate out the contained solid matters adapted to the manufacture of confectionery and the like, and applying centrifugal force to the remaining liquid extract so as to separate the same into a creamy emulsion containing a large percentage of oil and an aqueous flavoring extract.

In testimony of which invention, I have hereunto set my hand, at city of New York, on this 19th day of May, 1919.

WALLACE ALEXANDER.

Witnesses:
GEORGE R. REMINGTON,
S. E. BARNES.